US006231440B1

United States Patent
Yamashita

(10) Patent No.: US 6,231,440 B1
(45) Date of Patent: May 15, 2001

(54) COMPUTER GAME APPARATUS

(75) Inventor: Nobuyuki Yamashita, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/150,290

(22) Filed: Sep. 9, 1998

(30) Foreign Application Priority Data

Sep. 11, 1997 (JP) .................................................. 9-247351

(51) Int. Cl.$^7$ ....................................................... A63F 9/22
(52) U.S. Cl. ................................... 463/7; 463/30; 463/31
(58) Field of Search ................................. 463/7, 36, 37, 463/30–33; 273/438

(56) References Cited

U.S. PATENT DOCUMENTS

| 5,229,756 | * | 7/1993 | Kogusi et al. ..................... 273/438 |
| 5,616,079 | * | 4/1997 | Iwase et al. ........................ 463/32 |
| 5,649,861 | * | 7/1997 | Okano et al. ....................... 463/30 |

* cited by examiner

Primary Examiner—Jessica J. Harrison
Assistant Examiner—S Clayton
(74) Attorney, Agent, or Firm—Dickstein Shapiro Morin & Oshinsky LLP

(57) ABSTRACT

There is provided a computer game apparatus for executing a game in which a character moves through virtual space displayed on a predetermined display by a operation of a operating unit, comprising: a memory storing a game program having movement modes of the character in accordance with distance between the character and another character within the virtual space; and a controller executing the game program and controlling the movements of the character according to the movements modes. By way of example, a first movement mode of the character when the distance between the two characters is within a predetermined distance is set in the game program, and this first movement mode is, for instance, one of the characters moving at high speed in an arc around the other character with a predetermined angle.

18 Claims, 9 Drawing Sheets

*FIG. 5*

|  | DISTANCE L ≤ L1 | DISTANCE L > L1 |
|---|---|---|
| LEVER-INPUT ONLY | NORMAL MODE | NORMAL MODE |
| BUTTON-INPUT DURING LEVER-INPUT | DASH MODE | DASH MODE |
| LEVER-INPUT DURING BUTTON-INPUT | SHORT DASH MODE | DASH MODE |

COMPUTER GAME APPARATUS

BACKGROUND OF THE INVENTION

1. Field of the Invention

The present invention relates to a computer game apparatus for executing a game in which characters displayed on a predetermined display are operated by a predetermined operating unit.

2. Description of the Related Art

Conventionally, a computer game apparatus is known in which a player views images displayed on a display while using a lever or such like to operate a character fighter (hereinbelow referred to as "challenger") which competes, within the virtual space of the game, against an enemy character fighter (hereinbelow referred to as "enemy") of the game. In this type of game, when the two fighting characters located within the virtual space of the game are at a distance from each other, a shoot-out takes place using weapons which the two characters have. Alternatively, when the two characters are at close proximity, they fight each other in physical combat.

Therefore, by operating the lever and a switch or the like of the game device, the player moves his challenger away from the enemy when performing a shoot-out or closer to the enemy when performing physical combat.

And, since the fighting methods of physical combat and shoot-out are totally dissimilar, the characters must perform movements appropriate for both fighting methods. For instance, since physical combat is carried out at extremely close proximity to the enemy, the challenger needs to be manoeuvred around the enemy at high speed, swiftly avoiding enemy attacks while rapidly attacking the enemy.

By contrast, during a shoot-out, the two characters are at a distance from each other. Consequently, there is no need to move the challenger at high speed as in the case of physical combat.

However, conventionally, modes of moving the challenger which can be operated by the player have been the same for shoot-out and physical combat, with no separate movement mode settings appropriate for either of the two fighting methods.

SUMMARY OF THE INVENTION

It is therefore an object of the present invention to provide a computer game apparatus capable of performing different movements in accordance with fighting methods of characters when characters fight in virtual space of a game.

Furthermore, it is another object of the present invention to provide a computer game apparatus for automatically switching movement modes, corresponding to a same operation by a player, in accordance with fighting methods.

In order to achieve the above objectives, a first configuration of the present invention is a computer game apparatus for executing a game in which a character moves through virtual space displayed on a predetermined display by a operation of a operating unit, comprising: a memory storing a game program having movement modes of the character in accordance with distance between the character and another character within the virtual space; and a controller executing the game program and controlling the movements of the character according to the movements modes.

Furthermore, a second configuration of the present invention is the computer game apparatus according to the first configuration, wherein the movements modes include a first movement mode of the character when the distance is within a predetermined distance.

Furthermore, a third configuration of the present invention is the computer game apparatus according to the first configuration, wherein the movement modes have different movement modes in accordance with the distance on a same operation of the operating unit.

Furthermore, a fourth configuration of the present invention is the computer game apparatus according to the third configuration, wherein the movements mode include a first movement mode of the character when the distance is within a predetermined distance, and a second movement mode of the character when the distance is greater than the predetermined distance on a same operation of the operating unit.

A fifth configuration of the present invention is a computer game apparatus comprising: a display displaying an image of first and second characters located in virtual space viewed from a predetermined viewpoint within the virtual space, and a controller controlling movement of the first character to move in arc around a position of the second character with a predetermined angle when a distance between the first and second character is within a predetermined distance.

Finally, the present invention also provides a medium in which the above game program is stored.

BRIEF DESCRIPTION OF THE DRAWINGS

FIG. 5 is a diagram showing movement modes according to the present embodiment;

DESCRIPTION OF THE PREFERRED EMBODIMENTS

Figure 1:
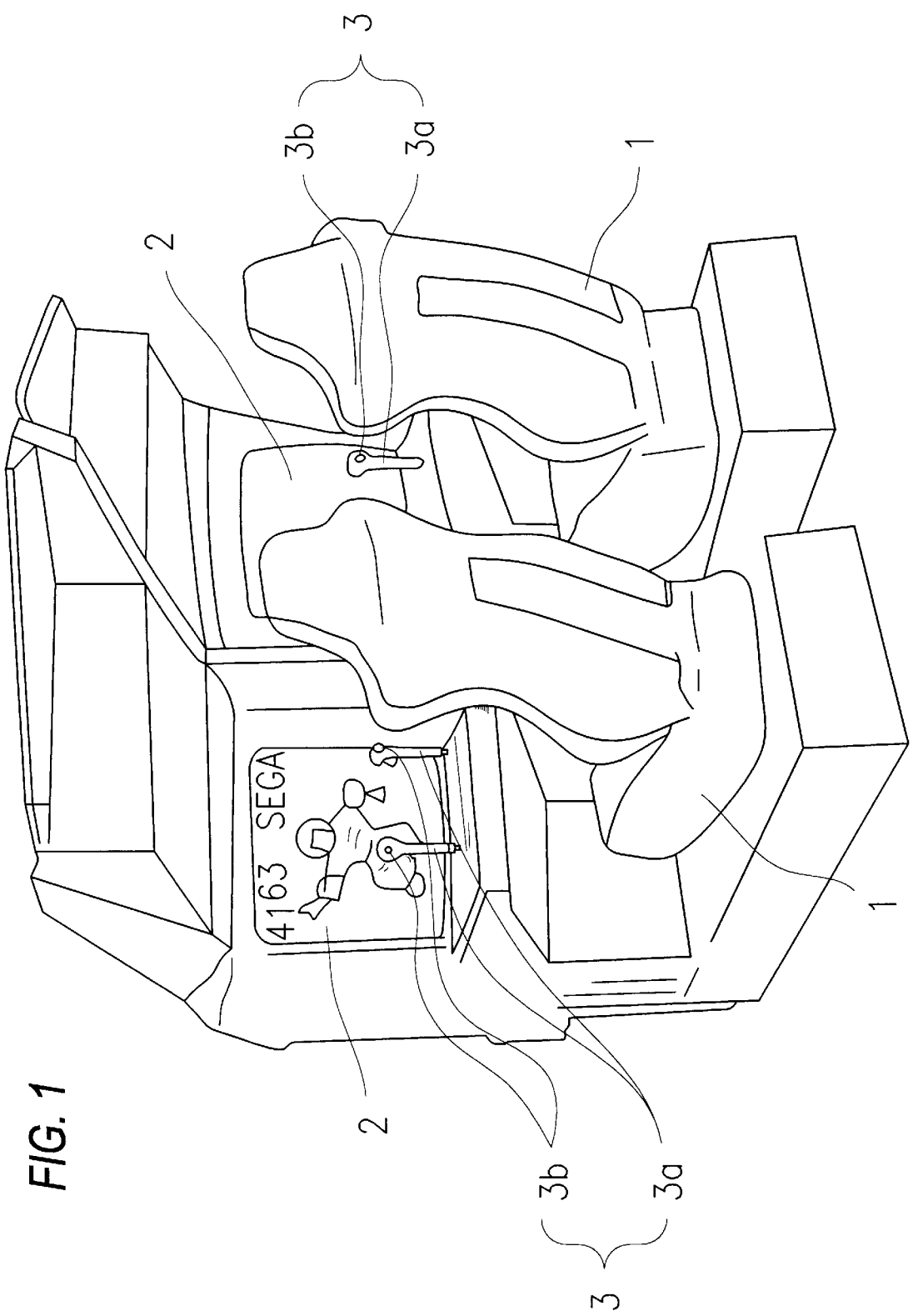
FIG. 1 is an external view of a computer game apparatus according to an embodiment of the present invention.

There will be detailed below the preferred embodiments of the present invention. However, the technological scope of the present invention is not limited to these embodiments. In the drawings, like and similar members are designated by like reference numbers and reference symbols.

Figure 2A:
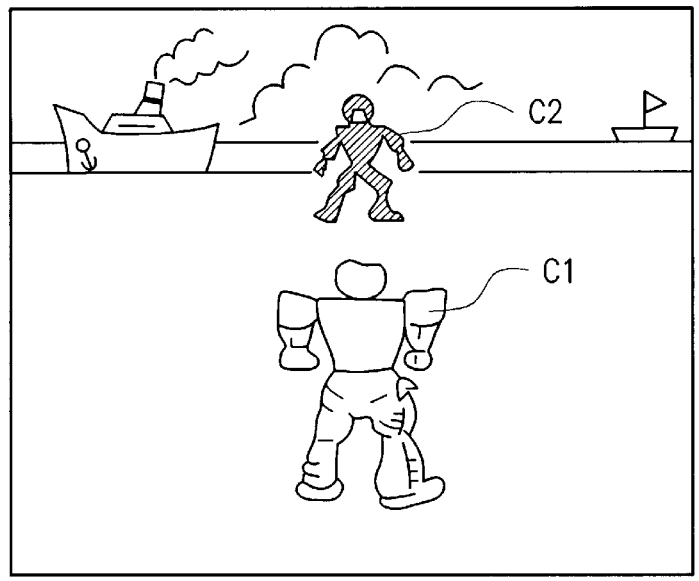
FIG. 2 is an example of an image in which fighting characters C1 and C2 displayed on a display 2 fight each other in simulated three-dimensional virtual space.
Figure 2B:
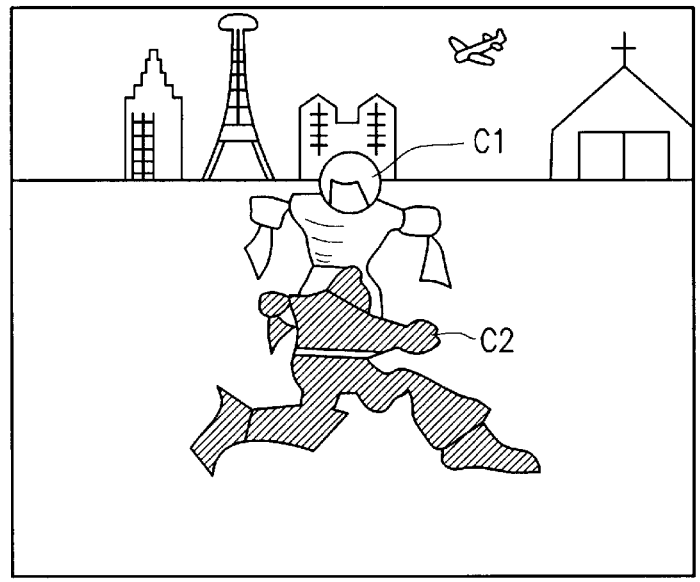

FIG. 1 is an external view of a computer game apparatus according to an embodiment of the present invention, illustrating a case where two identical games devices are connected together. As FIG. 1 shows, the game commences when a player sits in a seat 1 and inserts a predetermined sum of money into a coin insertion slot (not shown in the diagram). As shown in FIG. 2 (a) and FIG. 2 (b), an image of fighting characters C1 and C2 fighting each other in simulated three-dimensional virtual space is displayed on a display 2. Then, the player operates the character fighter C1 (hereinbelow referred to as "challenger") by an operating unit 3, comprising a lever 3a and a button 3b, so as to fight against the other fighting character C2 (hereinbelow referred to as "enemy"), while viewing the game on the display 2.

Figure 3:
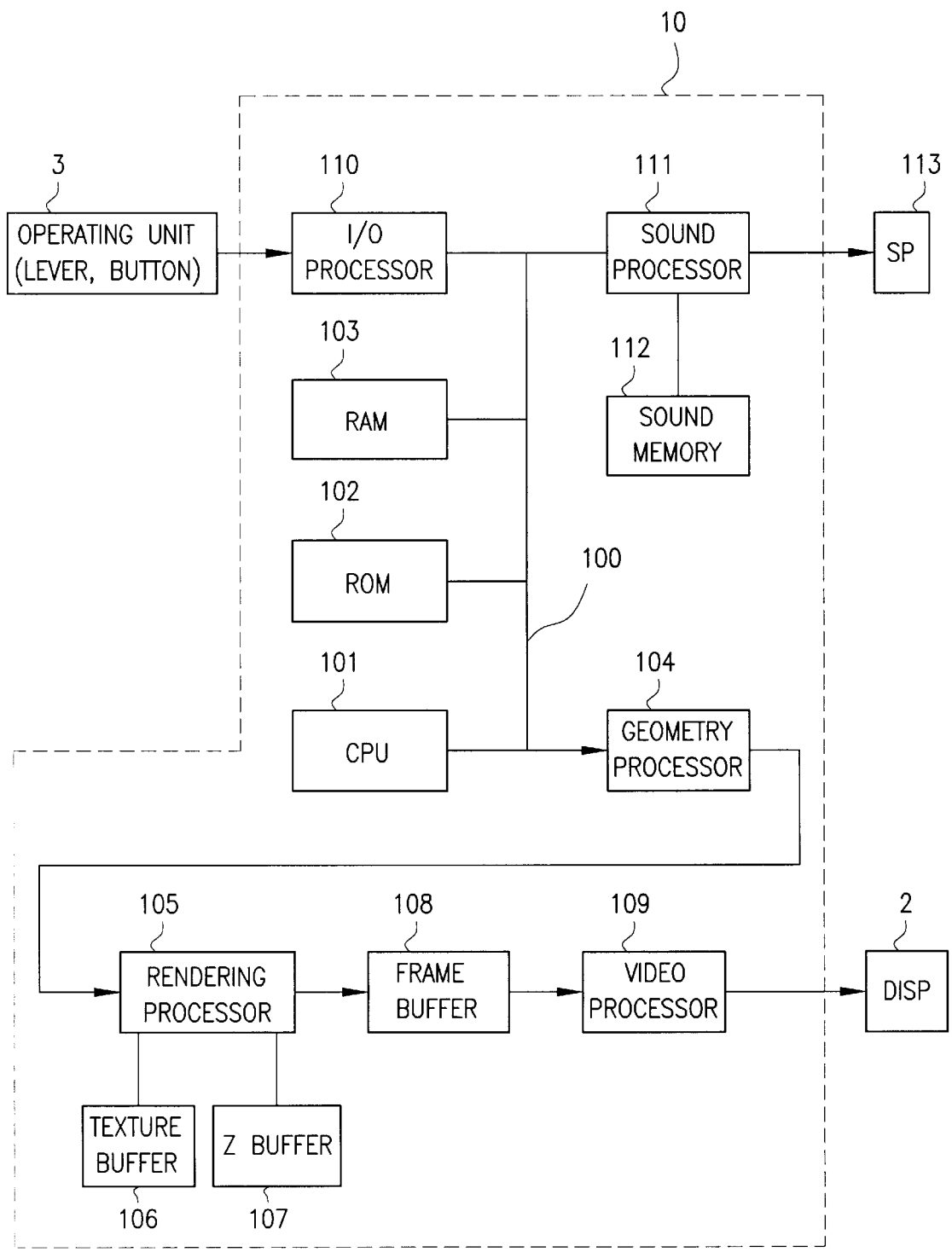
FIG. 3 is a block diagram showing an example configuration of a game unit according to the present invention provided inside a computer game apparatus.

FIG. 3 is a block diagram showing an example configuration of a game unit according to the present invention which is contained in the above-mentioned game device. In FIG. 3, a region 10, surrounded by a dotted line, is a portion provided inside the main body of the game device. As FIG. 3 shows, all components such as a CPU (described below) are connected via a bus 100.

A controller comprise a CPU 101, which processes the execution of programs based on game programs held in memory in a ROM 102. Predetermined game parameters which change as the game progresses, such as co-ordinates of characters in the virtual space, are held in memory in a RAM 103.

Next, these parameters which have been temporarily held in memory in the RAM 103 are sent to a geometry processor 104. The geometry processor 104 carries out predetermined processing of the co-ordinate changes based on apex data of polygons, which constitute the fighting characters and background in the three-dimensional virtual space of the game. More specifically, co-ordinates of polygons in a world co-ordinates system, set in the three-dimensional virtual space, are converted to co-ordinates in a viewpoint co-ordinates system when the virtual space is viewed from a viewpoint, this viewpoint being defined by co-ordinates of a single point in the world co-ordinates system.

Furthermore, a rendering processor 105 is connected to the geometry processor 104. Data, such as apex data of the polygons and data representing textures to be mapped over the polygons, are read out from the ROM 104 and temporarily stored in a texture buffer 106, which is connected to the rendering processor 105. Then, the rendering processor 105 pastes colours, shading, textures and the like onto each texture polygon based on the polygon texture data stored in the texture buffer 106.

Furthermore, in order to display the polygon co-ordinates on the display 2, the rendering processor 105 converts the polygon co-ordinates, which have been converted to a viewpoint co-ordinates system in three-dimensional virtual space, to a two-dimensional co-ordinates system. Moreover, data information (for instance, data indicating which polygon is to be displayed in the foreground or the like) relating to the depth direction (Z direction), which is required when converting polygon co-ordinates from a three-dimensional co-ordinates system to a two-dimensional system, is held in memory in a Z buffer connected to the rendering processor 105.

Data for one picture displayed on the display 2 is stored in a frame buffer 108, connected to the output of the rendering processor 105. A video processor 109 converts image data for one picture, read out from the frame buffer 108, into a video signal which is displayed sequentially on the display 2.

Furthermore, a lever and switch type operating unit 3, which is operated by the player, is connected through an I/O processor 110. The CPU 101 calculates the co-ordinates of characters and the like in the virtual space, based on operation signals input from the operating unit 3, and sends the result to the geometry processor 104.

In addition, a sound processor 111, for processing the sound production of a PCM/FM sound source, is connected to the bus 100. A sound memory 112 for holding audio data in memory is connected to the sound processor 111.

Furthermore, audio data processed by the sound processor 111 is converted from a digital sound source to an analog sound source, by means of a D/A converter not shown in the diagram, and is then transmitted as an audio signal to a speaker 113.

Figure 4:
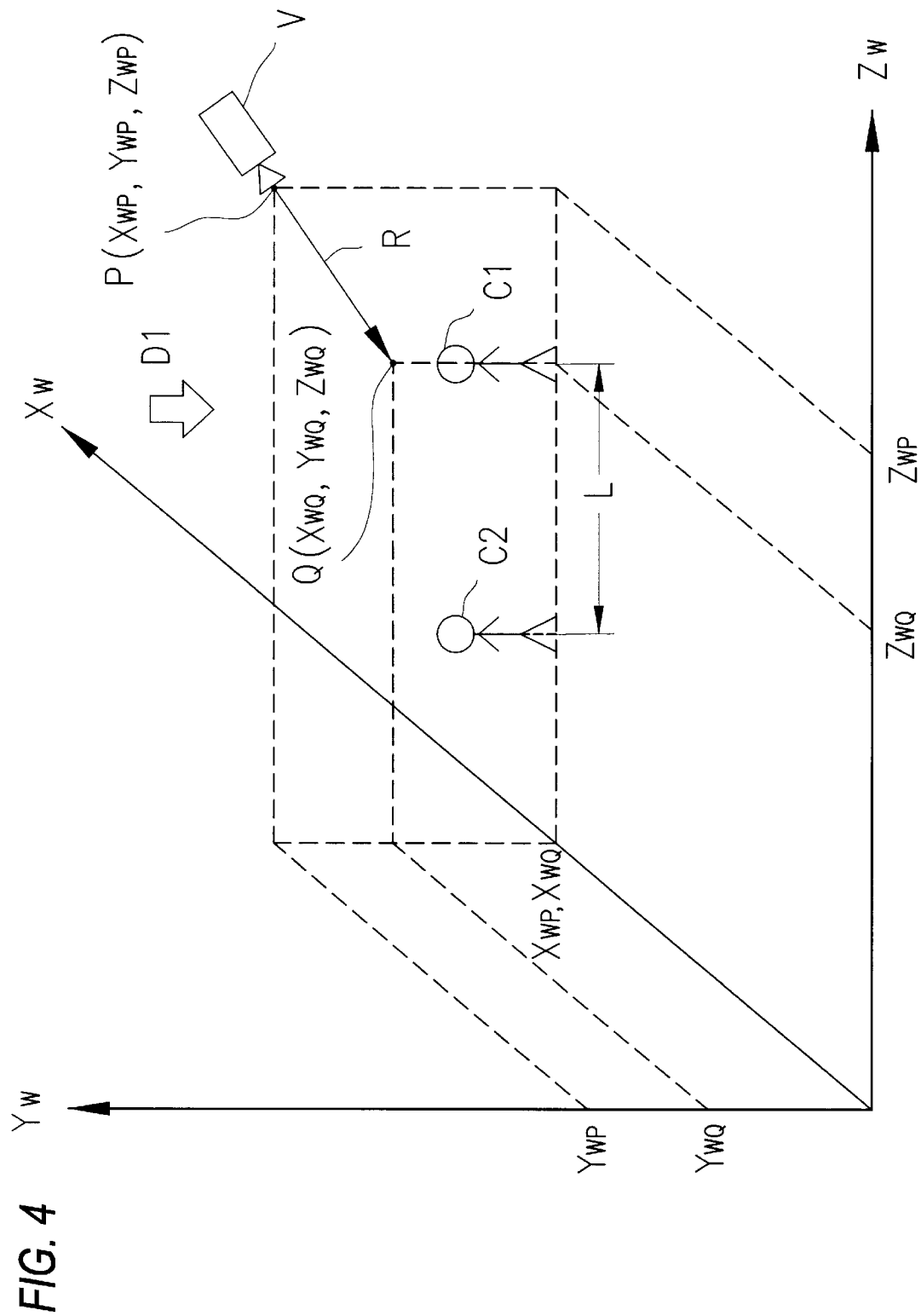
FIG. 4 is an example of a three-dimensional virtual space in which are located fighting characters C1 and C2.

FIG. 4 is a schematic view of the fighting characters C1 and C2 located in three-dimensional virtual space. The positions of the fighting characters in the virtual space of the above game are given as position co-ordinates (Xw, Yw, Zw) in a three-dimensional co-ordinates system (world co-ordinates system) in the virtual space. The positions of fixed objects and the like in the background are also given as position co-ordinates within the world co-ordinates system.

Images displayed on the display 2 are displayed as two-dimensional images viewed in a predetermined direction from co-ordinates (viewpoint co-ordinates) P of a single point in the world co-ordinates system in the three-dimensional virtual space. To the player, this gives the same sensation as if a video camera V had been positioned at a predetermined position in the virtual space and images filmed by that video camera were displayed on the display 2.

The viewpoint co-ordinates P (XwP, YwP, ZwP) are, for instance, set at viewpoint co-ordinates P diagonally above the rear of the challenger C1 in the world co-ordinates system. A viewline direction R from the viewpoint co-ordinates P is, for instance, set in the direction leading to observed point co-ordinates Q (XwQ, YwQ, ZwQ) near the top of the challenger C1 (for example, a position slightly higher than the head of the challenger C1).

Next, co-ordinate setting means for setting co-ordinates, comprising the geometry processor 104 depicted in FIG. 3, convert the co-ordinates of the fighting characters and the like within the world co-ordinates system to a viewpoint co-ordinates system (Xv, Yv, Zv) based on the viewpoint co-ordinates P and the viewpoint direction R. Moreover, the rendering processor 105 depicted in FIG. 3 further converts the co-ordinates to a two-dimensional screen co-ordinates system (Xs, Ys) by means of a predetermined projection process, in order to display them on a display.

Movement of the fighting characters in the virtual space is processed as changes of position co-ordinates within the world co-ordinates system. More specifically, the CPU 101 calculates position co-ordinates of the fighting characters based on information relating to amount of movement and movement direction, contained in operation signals from the operating unit 3 and the like.

Then, according to the embodiment of the present invention, the movement mode of the challenger, which moves on the display as a result of the player operating the operating unit 3, is reset to a different movement mode in accordance with a distance L between the challenger C1 and the enemy C2 in FIG. 4.

FIG. 5 is a diagram showing movement modes according to the present embodiment, which have been set based on the distance L between the challenger C1 and the enemy C2 in the virtual space, in correspondence with operation input patterns from the operating unit 3.

The movement modes corresponding to the operation input pattern from the operating unit 3 shown in FIG. 5 are written into the ROM 102 of FIG. 3 as part of the game program. Movement of the challenger C1 according to a movement mode of the present invention is processed by reading out the game program by a controller, comprised of the CPU 101, and executing the game program.

As FIG. 5 shows, the movement modes of the present embodiment comprise, for instance, three types: "Normal Mode", "Dash Mode") and "Short Dash Mode". When the distance L between the two fighting characters exceeds a predetermined distance L1, the challenger C1 is able to move in "Normal Mode" and "Dash Mode". When the distance L between the two fighting characters is less than the predetermined distance L1, in addition to the above-mentioned "Normal Mode" and "Dash Mode", the challenger C1 is also able to move in "Short Dash Mode", which is an appropriate moving mode when the two fighting characters are fighting at close proximity, as will be explained later.

Furthermore, according to the movement modes depicted in FIG. 5, for a plurality of operation input patterns, only a part of the movement modes changes in accordance with the distance L between the two fighting characters (in FIG. 5, the movement mode is switched in accordance with the distance L between the two fighting characters only in a case when there is lever-input during button-input). Therefore, there is no great variation among operation contents which might confuse the player.

Figure 6:
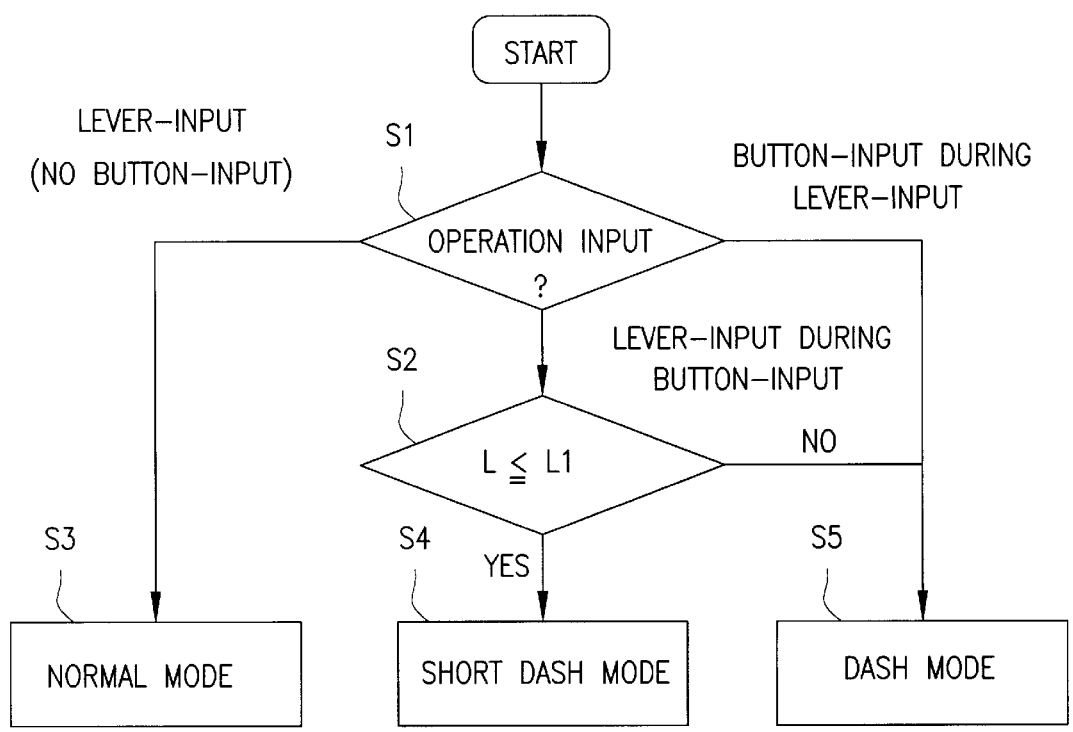
FIG. 6 is a processing flow chart illustrating movement modes of a challenger C1 in correspondence with control input.

FIG. 6 is a processing flow chart illustrating movement modes of the challenger C1 in correspondence with operation input from the operating unit 3. As FIG. 6 shows, the type of operation input from the operating unit 3 is determined in step S1. Next, when the player performs lever-input by tilting the lever 3a in the direction he wants to move the challenger C1, without performing button-input by pressing the button 3b, "Normal Mode" is set, irrespective of the distance L between the two fighting characters (Step S3).

"Dash Mode" is set when button-input is performed during lever-input (Step S5). Furthermore, when lever-input is performed during button-input, it is determined in Step 3 whether or not the distance L between the two fighting characters is within the predetermined distance L1. In a case where the distance L is greater than the predetermined distance L1, "Dash Mode" is set (Step S5). In a case where the distance L is within the predetermined distance L1, "Short Dash Mode" is set (Step S4).

Figure 7:
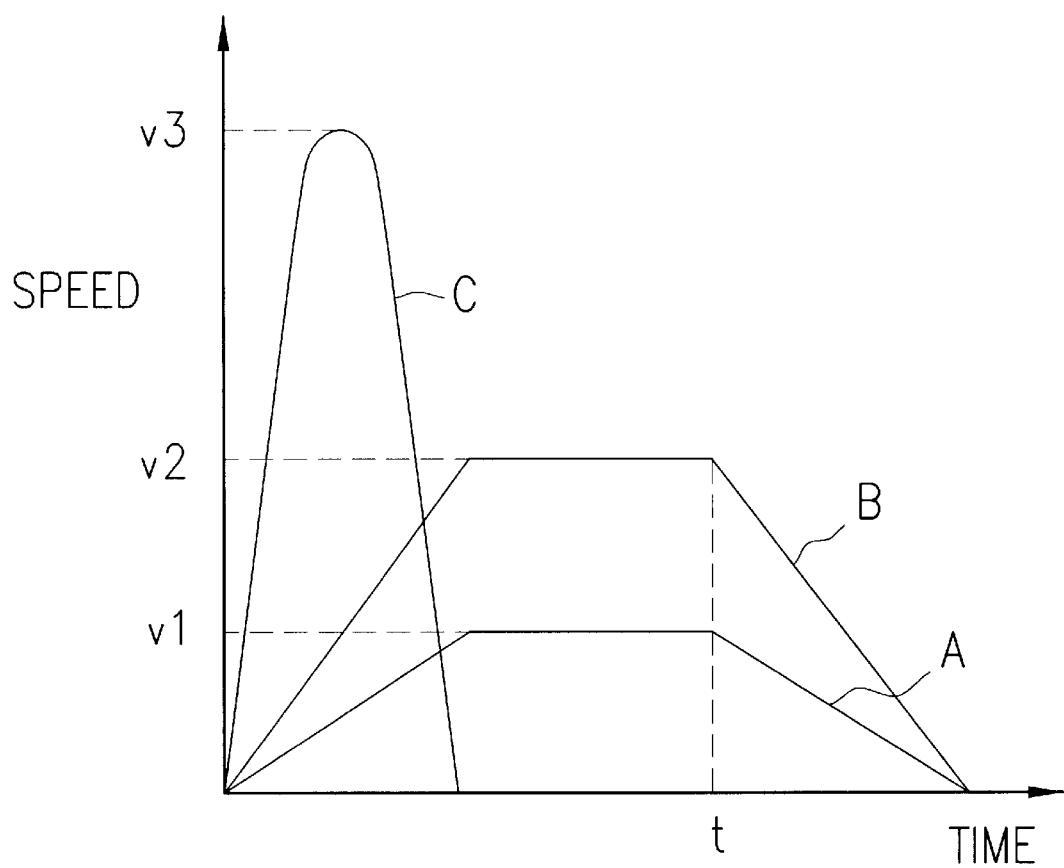
FIG. 7 is a diagram illustrating the relation between speed and time in the movement modes.

Next, these movement modes will be explained with reference to FIG. 7, which illustrates the relation between speed and time of the movement mode. As shown in FIG. 5 and FIG. 6, "Normal Mode" is set by performing lever-input without performing button-input, irrespective of the distance L between the two fighting characters. As a result, the challenger C1 moves in a straight line along the input direction. More specifically, as line A in FIG. 7 shows, the speed of the challenger C1 increases gradually, becoming constant when it reaches a predetermined speed v1. Then, when the lever is returned to its original position at time t, the speed is decreased by an amount equal to the amount of increase during acceleration, whereby the challenger C1 stops moving.

As FIG. 5 and FIG. 6 show, "Dash Mode" is set when button-input is performed during lever-input, irrespective of the distance L between the two fighting characters. "Dash Mode" is also set by performing lever-input during button-input when the distance L between the two fighting characters is greater than the 10 predetermined distance L1. As a result, the challenger C1 moves in a straight line along the direction in which the lever has been tilted, at a speed faster than the "Normal Mode", More specifically, as line B shows, when "Dash Mode" is set, the speed of the challenger C1 increases with greater acceleration than in "Normal Mode", becoming constant at a speed v2 which is faster than the predetermined speed v1. Then, when the lever is returned to its original position at time t, the speed is decreased by an amount equal to the amount of increase during acceleration, whereby the challenger C1 stops moving.

"Short Dash Mode" is a characteristic movement mode of the present invention, and can only be set when the distance L between the two fighting characters is within the predetermined distance L. In other words, as FIG. 5 and FIG. 6 show, in a case where the distance L between the two fighting characters is within the predetermined distance L1, "Short Das h Mode" is set by performing lever-input during button-input. As a result, the challenger C1 moves in an arc around the position of the enemy C2 at high speed with a predetermined angle in the direction in which the lever 3a has been tilted.

Figure 8:
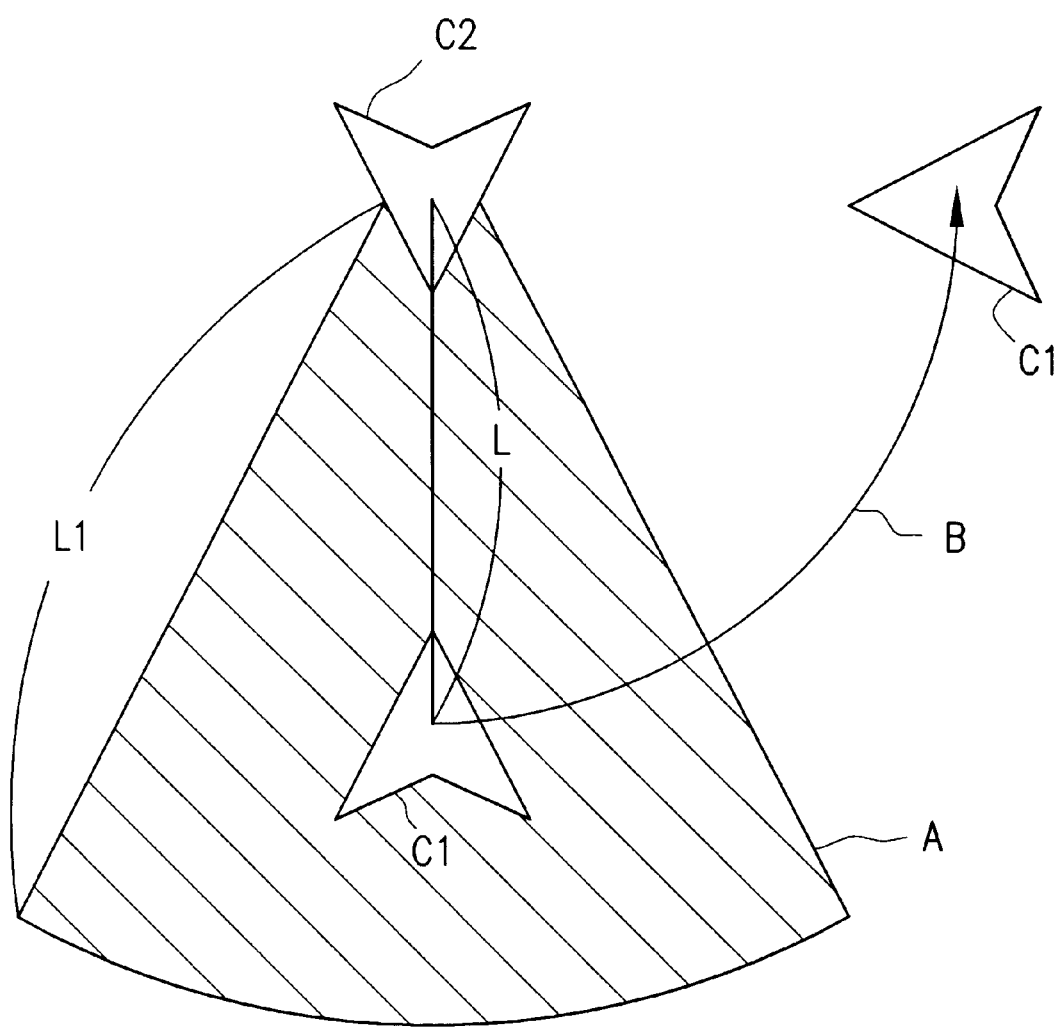
FIG. 8 is a schematic diagram showing the movement of the challenger C1 in "Short Dash Mode" in a case when the virtual space is viewed from the direction of the arrow D1 in FIG. 4.

FIG. 8 is a schematic diagram showing the movement of the challenger C1 in "Short Dash Mode" when the virtual space is viewed from the direction of the arrow D1 shown in FIG. 4. As FIG. 8 shows, the challenger C1 is within the predetermined distance L1 from the enemy C2, in a position inside the attack range A of the enemy C2, indicated by a diagonal-lined section. In such a case, when the player performs the "Short Dash Mode" operation, the challenger C1 can escape instantly from the attack range A of the enemy C2 and can be repositioned to a side which is outside the attack range A of the enemy C2. In other words, as indicated by arrow B, the challenger C1 moves only a fixed distance in an arc around the enemy C2 at extremely high speed.

Figure 9A:
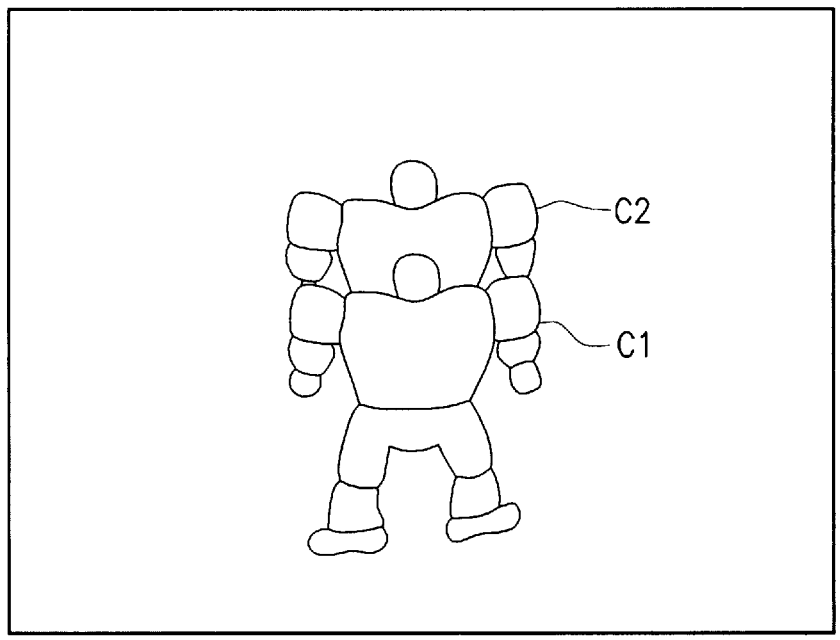
FIG. 9 is a diagram showing examples of displayed images before and after movement in "Short Dash Mode".
Figure 9B:
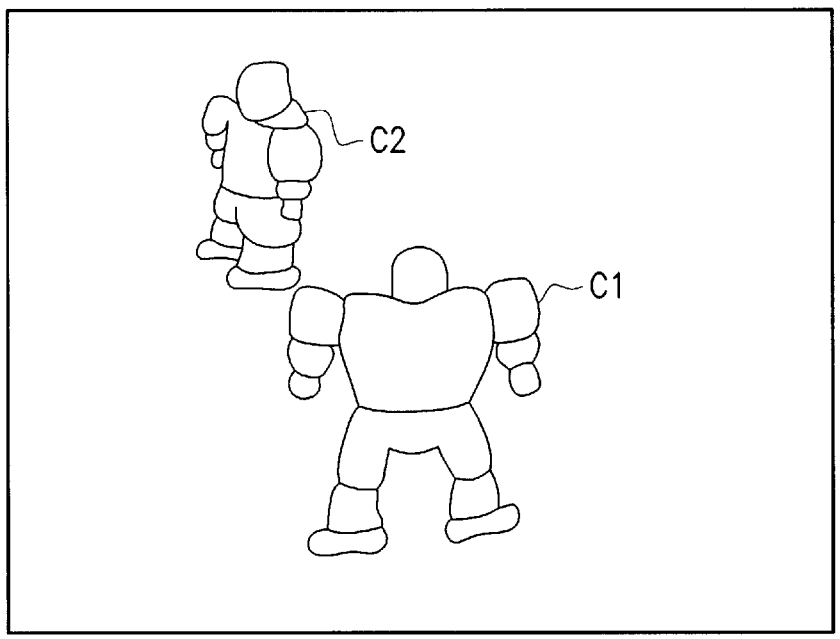

FIG. 9 shows examples of images displayed on the display 2 before and aftermovement in "Short DashMode" has been performed. FIG. 9 (*a*) shows an image prior to movement in "Short Dash Mode". The two fighting characters are facing one another and the challenger C1 is positioned within the attack range of the enemy C2. By contrast, in FIG. 9 (*b*), the challenger C1 has been moved in an arc around the enemy C2 and is now positioned to one side of the enemy C2.

Returning to FIG. 7, "Short Dash Mode" will now be explained in greater detail. As line C in FIG. 7 shows, when "Short Dash Mode" is set, the speed of the challenger C1 increases sharply with considerable more acceleration than in "Dash Mode" described above. Then, when the speed of the challenger C1 has reached a speed v3, which is faster than the speed v2, the speed is decreased sharply by an amount equal to the amount of increase during acceleration, whereby the challenger C1 stops moving. Here, even when the lever 3a is not returned to its original position, the challenger C1 decelerates sharply and momentarily stops. In other words, once "Short Dash Mode" input has been supplied, the sequence of operations described above (namely acceleration, deceleration and stop), are carried out irrespective of how the operating unit 3 is operated.

It is also possible for the player to have the challenger Cl escape from the attack range A by means of movement based on the "Normal Mode" and "Dash Mode" described above. But, when the characters are fighting in physical combat at close proximity to one another, movement in "Normal Mode" and "Dash Mode" is too slow to avoid the attacks of the enemy C2, with the result that the challenger C1 suffers enemy attacks while escaping. In contrast, as explained above, in "Short Dash Mode" it is possible to accelerate greatly and reach high speed instantly, enabling the challenger C1 to escape from the attack range of the enemy C2 without suffering the enemy attacks. Moreover, after escaping, the challenger C1 instantly stops at a position to one side of the enemy C2. From this advantageous position, the challenger C1 is able to attack the enemy C2 quickly.

Furthermore, as FIG. 5 clearly illustrates, "Short Dash-Mode" is not set when the distance L between the two fighting characters is greater than the predetermined distance L1. This is because in a case where the distance L is greater than the predetermined distance L1 and the two fighting characters are performing a shoot-out, even when the challenger C1 is inside the attack range of the enemy C2, the challenger C1 is sufficiently capable of avoiding the attacks of the enemy C2 by moving in the "Normal Mode" and "Dash Mode". Thus "Short Dash Mode" is an extremely effective movement mode when the two characters are at close proximity.

And, as FIG. 5 clearly illustrates, different movement modes are set in accordance with the distance L between the two fighting characters, even when the same operation has been performed by the player. In other words, as described above, in a case where the lever 3a has been tilted while the button 3b is being pressed when the distance L between the two fighting characters is greater than the predetermined distance L1, movement in "Dash Mode" is performed, and movement in "Short Dash Mode" is performed when the distance L is within the predetermined distance L1. The reasons for this are as follows.

In order to perform "Short Dash Mode", a new addition according to the embodiment of the present invention, it is acceptable to provide a operation sequence different from the operation sequences for "Normal Mode" and "Dash Mode". However, since "Short Dash Mode" is a movement mode which is only applicable when the space between the two fighting characters is within the predetermined distance L1, it would be extremely inefficient to add a new button and set another operation sequence. Moreover, the player would have to memorize an additional operation sequence, with the consequence that the game would be less interesting.

Therefore, by performing movements appropriate to the fighting style in accordance with the distance L between the two fighting characters by means of one operation sequence, the player can operate the challenger C1 without becoming confused over the operation. And, the player is able to enjoy a better quality contest when operating the challenger C1 in physical combat against the enemy C2.

Another embodiment of the present invention will next be explained. In this embodiment, the weapons of the fighting characters in the virtual space of the game shown above in FIG. 4 are switched during the fight, according to whether the distance L between the challenger C1 and the enemy C2 is a short distance, a mid-distance or a long distance.

By way of example, when the distance L between the two fighting characters is a short distance within the distance L1, the characters fight using their bodies. When the distance L is a mid-distance greater than the distance L1 but within a distance L2, which is longer than a distance K1, the characters fight by shoot-out. When the distance L is a long distance greater than the distance L2, the characters fight using bazookas. Attacks are carried out by pressing button 3b of FIG. 1, with the attacks carried out in correspondence with the distance L between the two fighting characters.

Thus, according to the present embodiment, different attacks are carried out by the same operation, namely the pressing of button 3b, in accordance with the distance L between the two fighting characters in the game.

Further, in the present embodiment, by tilting lever 3a, the player is able to move the challenger C1, in that direction, for no longer than the duration of tilting. And, in the present game, when the player performs a operation (hereinbelow referred to as "special movement operation") comprising, for instance, "tilting press lever 3a twice in the same direction instantly", the challenger C1 is able to move differently in accordance with the distance L between the two fighting characters. In other words, when a special movement operation is performed in a case where the distance L between the two characters is the abovementioned short distance, the challenger C1 moves in the manner of a boxing "sway", and is able to avoid the punching attacks of the enemy C2 effectively.

Furthermore, when the special movement operation is performed in a case where the distance L between the two characters is the abovementioned mid-distance, the challenger C1 leaps away along the direction in which the lever 3a has been tilted instantly, and is able to avoid bullets from a gun fired by the enemy C2 in an instant.

Furthermore, when the special movement operation is performed in a case where the distance L between the two characters is the abovementioned long distance, the challenger C1 moves quickly at high speed in the direction in which the lever 3a has been tilted, and is able to retreat outside the explosion radius of the bazookas fired by the enemy C2.

In this way, the challenger C1 performs movements according to different movement modes, which differ in accordance with the distance L between the two characters, even when the same operation has been performed, namely the special movement operates described above.

As already explained, these movement modes are written in a ROM 2, comprising part of the computer game program, and the CPU 101, which constitutes a controller for executing the game program, selects a corresponding movement in accordance with the distance L between the two characters. Then, an image of the challenger C1 performing movement in the virtual space according to the selected movement mode, is sent via the predetermined co-ordinates conversion processing described above and displayed on a display.

In the embodiments of the present invention described above, the number of enemies is not limited to the one enemy C2, and a plurality of enemies is acceptable. In such a case, for instance, the movement modes may be switched in accordance with the distance from the challenger C1 to a middle position among the plurality of enemies.

Furthermore, the embodiments of the present invention are not limited to fighting games of the type described above. By way of example, the present invention can be applied in a simulated sports game in which a game is performed by operating characters displayed on the display 2. For instance, in a simulated skiing race featuring virtual skiing with a virtual skier operated by the player, "Short Dash Mode" can be used to avoid obstacles in the game when the distance between the skier character and the obstacles is one in which collision is liable to occur.

According to the present invention, when characters fight against each other in virtual space on a computer game, movement modes of the characters, which move within the virtual space, are set in accordance with the space between the characters in the virtual space. Consequently, when performing fighting methods which differ according to the space between the characters, the characters are able to perform movements appropriate to the fighting methods. Therefore, a better quality contest is possible in the computer game, whereby the nature of the game is greatly improved.

Furthermore, when the movement modes are set in accordance with the space between the characters, different movement modes are set in correspondence with a same operation input by the player. Therefore, even when only one operation input has been performed by the player, the movement mode is automatically switched to a movement mode which is appropriate to the fighting method. As a consequence, a greater number of movement modes can be obtained by a small number of operations, further improving the nature of the game.

What is claimed is:

1. A computer game apparatus for executing a game in which a first character moves through virtual space displayed on a predetermined display by operation of an operating unit, the computer game apparatus comprising:
   a memory for storing a game program having predetermined movement modes of the first character in accordance with a distance between the first character and a second character within the virtual space; and
   a controller for executing the game program and controlling the movements of the first character according to the predetermined movement modes.

2. The computer game apparatus according to claim 1, wherein the movement modes include a first movement mode of the first character when the distance is within a predetermined distance.

3. The computer game apparatus according to claim 1, wherein the movement modes are different for a same operation of the operation unit depending upon said distance.

4. The computer game apparatus according to claim 3, wherein the movement modes include a first movement mode of the first character when the distance is within a predetermined distance, and a second movement mode of the first character when the distance is greater than the predetermined distance on a same operation of the operating unit.

5. A computer game apparatus comprising:
   a display for displaying an image of a first character located in virtual space viewed from a predetermined viewpoint within the virtual space, and
   a controller for controlling movements of the first character in accordance with a distance between the first character and a second character in the virtual space.

6. The computer game apparatus according to claim 5, wherein the controller controls the movement of the first character corresponding to operation by a player.

7. The computer game apparatus according to claim 6, wherein the controller controls the movement of the first character differently on a same operation by the player when the distances are different.

8. A computer game apparatus comprising:
   a display for displaying an image of first and second characters located in virtual space viewed from a predetermined viewpoint within the virtual space, and
   a controller for controlling movement of the first character to move in an arc with a predetermined angle around a position of the second character when a distance between the first and second character is within a predetermined distance.

9. A medium having a computer game program for executing a game in which a first character moves through virtual space displayed on a display, the computer game program comprising:
   data of predetermind movement modes of the first character in accordance with a distance between the first character and a second character within the virtual space; and
   a controller for controlling the movement of the first character according to the movement modes.

10. The medium having a computer game program according to claim 9, wherein the movement modes include a first movement mode of the first character when the distance is within a predetermined distance.

11. The medium having a computer game program according to claim 9, wherein the movement modes are different for a same operation of the operation unit depending upon said distance.

12. The medium having a computer game program according to claim 11, wherein the movement modes include a first movement mode of the first character when the distance is within a predetermined distance, and a second movement mode of the first character when the distance is greater than the predetermined distance on a same operation by a player.

13. A medium having a computer game program displaying an image of a first character located in virtual space viewed from a predetermined viewpoint within the virtual space, the computer game program comprising:
   a detector for detecting a distance between the first character and a second character in the virtual space; and
   a controller for controlling movement of the first character in accordance with the distance between the first character and the second character in the virtual space.

14. The medium having a computer program according to claim 13, wherein the controller controls the movement of the first character corresponding to operation by a player.

15. The medium having a computer game program according to claim 14, wherein the controller controls the movement of the first character differently on a same operation by the player when the distances are different.

16. A medium having a computer game program for displaying an image of a first character located in virtual space viewed from a predetermined viewpoint within the virtual space, the computer game program comprising:
   a detector for detecting a distance between the first character and a second character in the virtual space; and
   a controller for controlling movement of the first character to move in an arc with a predetermined angle around a position of the second character when the distance between the first and second character is within a predetermined distance.

17. A method for executing a computer game program for displaying an image of a first character located in virtual space viewed from a predetermined viewpoint within the virtual space comprising the steps of:
   storing a game program having movement modes of the first character in accordance with a distance between the first character and a second character within the virtual space; and
   controlling the movement of the first character according to the movement modes.

18. A method for executing a computer game program for displaying an image of a first character located in virtual space viewed from a predetermined viewpoint within the virtual space comprising the steps of:
   detecting a distance between the first character and a second character in the virtual space; and
   controlling movement of the first character in accordance with the distance between the first character and the second character in the virtual space.

* * * * *